Figure 1:
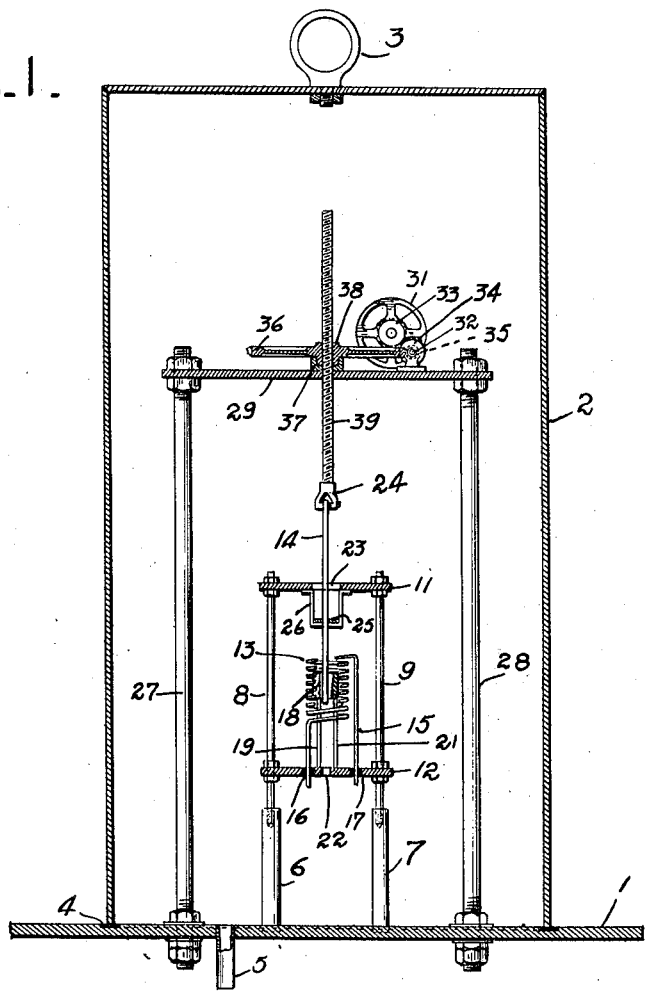

Oct. 29, 1929.    J. H. RAMAGE    1,733,752
REFRACTORY METAL AND ITS MANUFACTURE

Filed Oct. 28, 1922

INVENTOR
JOHN H. RAMAGE
BY
ATTORNEY

Patented Oct. 29, 1929

1,733,752

UNITED STATES PATENT OFFICE

JOHN HUMPHREYS RAMAGE, OF BLOOMFIELD, NEW JERSEY, ASSIGNOR TO WESTINGHOUSE LAMP COMPANY, A CORPORATION OF PENNSYLVANIA

REFRACTORY METAL AND ITS MANUFACTURE

Application filed October 28, 1922. Serial No. 597,444.

This invention relates to refractory metals and more particularly to the manufacture of tungsten and equivalent material in a special crystalline form.

An object of my invention is the manufacture of non-sag and non-offset refractory metal suitable for making filaments for incandescent lamps and the like.

Another object of my invention is the production of ingot or filamentary tungsten in the form of a single crystal, by heat treatment in a vacuum or in the vapor of an alkali metal.

A further object of my invention is the heat treatment of tungsten whereby the crystals thereof are developed to such an extent that relative movement therebetween is obviated when it is used in the form of a filament in an incandescent lamp.

A still further object of my invention is the manufacture of ductile tungsten without mechanically working it.

Other objects and advantages of the invention will be apparent as the description proceeds.

For a filament for incandescent lamps, it is desirable to have a metal which will not sag or off-set after it has been used for any length of time heated to incandescence. In the case of electric incandescent-lamp filaments, the high temperatures at which they are run have caused them to elongate or sag between their supports.

In the corresponding application of W. B. Gero, Serial Number 588,364, filed September 15, 1922, now Patent No. 1,602,526, control of crystal development in refractory metals, and assigned to the Westinghouse Lamp Company, is described and claimed a method for producing refractory metal filaments, resistant to sag, twist and other distortion. Such method comprises, in brief, the addition of alkali or alkaline-earth-metal compounds to the powdered oxide of the metal before reducing the same in hydrogen according to the usual method of preparing the metal. Such a method has been found to work well and give a product resistant to sag, twist and off-set, but is not free from occluded gases, because it is formed in a gaseous atmosphere.

Such gases appear to affect the properties of the resulting metal, especially with respect to their behavior when drawn into wire.

According to the method described in said copending application, wire has been produced having exaggerated crystals, of contour depending on the additive material. It is thought that, during the usual sintering and heat-treatment of the material for making the wire, a large part of the additive material is vaporized and lost so that the treatment is not as effective as possible. It is also probable that gases which deleteriously affect the character of the resultant metal, are absorbed from the surrounding atmosphere.

I propose, in view of the above difficulties, to either treat the material, consisting mainly of tungsten or its equivalent, in an alkali-metal atmosphere or a vacuum or to follow the former by the latter, whereby the beneficial alkali metal, formerly added as a compound to the powdered oxide before reduction, may be kept in intimate contact with the refractory metal, which is, at the same time, protected from the action of gases which may be occluded. If vacuum treated, not only is the occlusion of gases prevented, but previously occluded gases may be eliminated to a great extent.

The ideal non-sag, non-offset wire is wire having no grain boundaries, i. e., single-crystal wire. Such a wire would be non-sag, non-offset, strong and ductile both hot and cold. I propose to produce such a wire by subjecting tungsten metal, in slug or ingot form, to heat treatment in an environment which prevents the occlusion of gases by the tungsten.

According to my invention, I prepare single-crystal, non-sag, non-offset tungsten or "mono-crystalline" tungsten, in a simple and efficient manner as follows. The pure tungstic oxide, prepared in any usual manner, may be reduced to metallic-tungsten powder by heating in an atmosphere of hydrogen, according to the usual method. The metallic powder may then be formed into a slug, sufficient pressure being applied so that it may be handled without breaking. The slug may be partially sintered to produce the desired cohesion if sufficient pressure be not applied. It is then passed slowly through a very hot zone where it is heated to its critical grain-growing temperature or that temperature at which the crystals of tungsten develop in size most quickly. Such treatment may be accomplished in an electric furnace, either in a vacuum or in the presence of the vapor of an alkali metal or metals. A special treating furnace is preferably, but not necessarily, used for this process.

A slug of tungsten treated according to this method is ductile without swaging or cold working and may be drawn or rolled down to the desired wire size. If cold working hardens the wire too much, it may be worked cold and each reduction, if necessary, followed by simple heat treatment in order to keep the wire in a single-crystal condition, i. e., the dies or rolls may be followed by the heating unit instead of being preceded by it, as at present.

This process has but one operation in common with that at present in general use, i. e., pressing. The product resulting from such treatment is different from the present product in that it is ductile, whereas, at present, the slug is brittle and all effort is directed to make it ductile in subsequent operations.

Tungsten, treated according to my improved process, is more metallic in its characteristics than tungsten heretofore produced and it is evidently the metal in a purer form.

Figure 2:
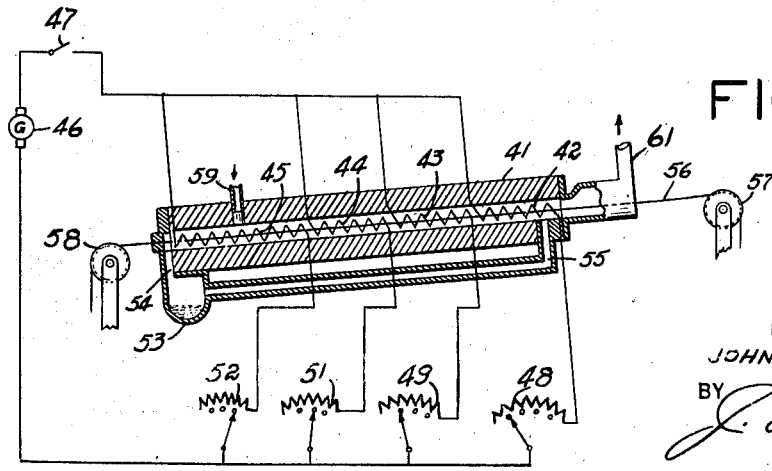

My invention will better be understood by reference to the accompanying drawing, in which, Figure 1 is a sectional side elevation of my slug-treating induction furnace; and Figure 2 is a longitudinal sectional elevation, partly diagrammatic, of my wire-treating furnace.

The induction furnace shown in Figure 1, may be supported by a metallic base plate 1 and may comprise an outer casing 2, which may be provided with a ring 3 suitably connected to the top thereof, for the purpose of lifting said casing from the supporting plate 1. Any suitable means may be provided for making an air-tight joint between the casing 2 and the support 1; for example, a rubber gasket 4 may be inserted therebetween. An outlet pipe 5, preferably extending from the supporting plate 1, may be provided for the purpose of exhausting the space between the casing 2 and the supporting plate 1. Standards 6 and 7, extending from the base plate 1, may support rods 8 and 9 threaded therein, which rods may support plates 11 and 12 for holding the heating element 13 of the furnace and guiding the refractory metal slug 14 undergoing treatment therein.

The heating element 13 of the furnace preferably comprises a primary coil 15 supported on the lower plate 12 through which the ends of said coil 15 pass. Insulating bushings 16 and 17 are provided between the plate 12 and the ends of the coil 15 passing therethrough. The coil 15 may be connected to a suitable source of very high-frequency alternating current in any suitable manner (not shown). The secondary 18 of the furnace may comprise a tungsten cylinder with a tapered coaxial aperture therethrough, large enough at its lower end for the tungsten slug 14 to pass therethrough and slightly larger at its upper end. The secondary 18 may be supported by the lower plate 12 on insulating rods 19 and 21. An aperture 22 is provided in the lower plate 12 for the purpose of allowing the tungsten slug to pass through said plate.

The upper plate 11 is provided with a slot 23 for the purpose of allowing the clamping jaw 24 that holds the tungsten slug 14 to pass therethrough. A guiding plate 25 may be provided for the tungsten slug 14, which plate may be held in position from the upper plate 11 by means of a U-shaped bracket 26. Rods or standards 27 and 28, holding a motor-supporting plate 29, are also provided, as shown, extending from the base plate 1. The motor 31, supported on the plate 29, may be geared to a worm shaft 32 by means of spur gears 33 and 34. The worm 35 on shaft 32 meshes with wheel 36 suitably supported in bearing 37 on plate 29. The interior of the hub 38 of the wheel 36 has a screw-threaded engagement with the vertical shaft 39, to the lower end of which is attached the clamp 24 holding the tungsten slug 14 undergoing treatment. Any suitable means (not shown) may be provided for energizing the motor 31 from a source of electricity and causing the same to run in either direction.

The operation of the apparatus, for practicing my method of treating a refractory metal such as tungsten, is as follows. A slug of tungsten or the like 14 may be prepared by pressing the pure metal powder to a desired size, for example, from ⅛ in. to ¼ in. sq. and about 8 ins. long. The metal powder used for making such a slug is preferably as pure as can be made by the usual method of preparation. The slug may then be partly sintered in a reducing or inert atmosphere to a temperature high enough to make it possible to handle the same without breakage, for example, to about 1600° to 1800° C. If formed under sufficient pressure, the partial sintering may be dispensed with. The casing 2 may be removed from the furnace, the threaded rod 39 raised, by actuating the motor 31 in the proper direction, and the slug 14 inserted and held in the clamp 24. The casing 2 may then be replaced and the atmosphere therein exhausted by means of a vacuum pump or the like, connected to outlet or exhaust pipe 5.

The primary 15 may then be energized from a suitable source of very high-frequency current until the secondary 18 becomes heated to incandescence, for example, to a temperature about 2200° to 2700 C. The slug 14 is then lowered through the aperture in the guiding plate 25 by running the motor 31 in the direction adapted to cause the threaded rod 39 to descend. Because of the reduction gearing between the motor and the threaded rod 39, the tungsten slug is caused to pass slowly, say at a speed of 3 inches per hour, through the incandescent secondary 18, where it is heated to incandescence by radiation therefrom.

The effect of such heat treatment in a vacuum is to purify the tungsten by driving off occluded gases and vapors, vaporize solid compounds and permit the crystalline structure of the slug to grow gradually, starting at the end first heat-treated, until it comprises a single crystal. After the slug has descended the full distance permissible, the motor may be stopped, the source of electricity disconnected from the heating element 13 and the apparatus allowed to cool. The casing 2 may be lifted off after the vacuum therein has been broken. The tungsten slug 14 may then be removed from the apparatus, and the upper part, which is held to the clamp 24 and which, therefore, is not subjected to heat-treatment, may be removed.

The heat-treated portion of the slug will be found to be unusually pure and workable either hot or cold. The crystalline structure within the slug develops by gradual crystalline growth from the hot zone through which the slug passes, until, at the end, the entire mass has been converted into a single crystal. As such a slug is ductile without swaging or cold working, it may be formed into useful wire size by immediately rolling and drawing. After working cold until the wire becomes too hard, the same may be annealed in the manner in which most metals are annealed between the rolling or drawing operations. That is, the rolls or dies may be followed by a heating unit, instead of preceded by it, according to the present practice.

The apparatus illustrated in Figure 1 is suitable for treating tungsten in the presence of alkali-metal vapors, as well as in a vacuum, that is, such vapor may be provided by distilling an alkili metal into the furnace after the air therein has been evacuated and while the slug is undergoing treatment, as previously described. Such vapor treatment could be followed by a treatment in a vacuum, if desired.

Another method of forming a single crystal slug, adapted for making non-sag and non-offset wire, is to press a small piece of large-crystal wire or, preferably, a single crystal, for example, a piece of tungsten wire ½ to 1 centimeter in length and about 7 mils in diameter, into one end of a slug of tungsten while the same is pressed from the metal powder, prepared as hereinbefore described.

Such a slug may then be treated in the same furnace as previously described, the end of the slug, with the single crystal pressed therein, being made the lower end, so that the treatment and, therefore, the grain growth of the slug would start from the end in which the crystal is pressed. Such a crystal functions as the nucleus for the grain growth in the slug, whereby a large-crystal or single-crystal slug is produced.

The same tendency to form large crystals or a single crystal in a tungsten slug may be imparted thereto by mixing with the metal powder, before pressing into a slug, a small amount, for example, about 1% of a refractory oxide which volatilizes at the critical temperature, that is, the temperature at which the slug is treated according to my improved process or the temperature of rapid grain growth or a little below such temperature. Such an admixture would restrain any grain growth until the hot zone is reached, at which place the rapid grain growth will occur because of the great difference in grain size between adjacent grains. Many metals also volatilize within the critical range desired and may be used instead of a refractory oxide.

The following materials are examples of suitable reagents for the purpose mentioned: $Al_2O_3$, $B_2O_3$, $Fe_2O_3$, $MgO$, $Cu$, $Al$, $Fe$, $Mg$, $Cr_2O_3$, $MoO_3$, $Si$ and amorphous $SiO_2$. Of course, the materials here mentioned have to be varied according to the atmosphere used in the treating furnace, whether a vacuum or a reducing atmosphere, and the type of metal being treated.

Metal treated in a vacuum in the pressed-powder form, doped with $Ti$, $B$, $Cu_2O$, $Tl_2O$ or $Cr_2O_3$, would give desired results while metal treated either in a vacuum or in hydrogen and then retreated would require a more persistent material such as $SiO_2$, $Al_2O_3$, $U_3O_8$ or even $Zr_2O_3$ mixed therewith.

Another method for treating a refractory metal slug according to my invention, is to treat a small portion at one end of either a pressed or partly sintered bar of tungsten, for example, with alkali metal by exposing it to alkali-metal vapor, such as potassium, rubidium or ceasium vapor and then obtain favorable conditions for the development of a single crystal by passing the slug through the special treating furnace above described, starting the treatment at the alkali-treated end of the slug.

If it is desired to treat the drawn wire in a finished size instead of the slug, apparatus such as is illustrated in Fig. 2 may be used. A refractory tube 41 may contain a series of heating coils 42, 43, 44, and 45 therein, which coils are adapted to be heated to different temperatures by means of electric energy supplied from a generator 46 or other suitable source of electricity. A switch 47 serves to connect and disconnect the source of electricity from the heating coils. Rheostats 48, 49, 51 and 52, respectively, serve to regulate the amount of current flowing through heating coils 42, 43, 44 and 45.

By this arrangement, a gradually increasing temperature may be provided in the tube 41 from the end containing the coil 42 to that containing the coil 45. A retort 53 may be connected to the interior of the tube by means of passageways 54 and 55. The retort 53 may contain alkali metal, compounds thereof or a mixture of alkali metals or compounds thereof, which may be heated therein to provide the desired atmosphere in the interior of the tube 41, for the suitable treatment of a filament or wire of tungsten 56, adapted to be passed through said tube from spool or reel 57 to spool or reel 58. In order to obtain a non-oxidizing or reducing atmosphere in the tube 41, hydrogen or other reducing or inert gas may be passed therethrough from inlet 59 to outlet 61.

In treating the tungsten wire by means of apparatus such as is shown in Fig. 2, the rheostat 52 is adjusted after the switch 47 is closed so that the heating coil 45 provides a temperature in the tube 41 which is best adapted for causing rapid grain growth in the wire, for example, that of about 2500° C. The other rheostats are adjusted to provide a gradually decreasing temperature in the tube from the coil 45 to the coil 42. The retort 53 may contain an alkali metal, preferably potassium, sodium or potassium or sodium amide ($KNH_2$ or $NaNH_2$). Such amide compounds are preferred to other compounds because, when heated, they break up into the alkali metal, nitrogen and hydrogen. The retort 53 is heated to provide the desired atmosphere in the tube 41, and a stream of hydrogen may be passed through said tube from the inlet 59 to the outlet 61.

The apparatus is tilted at an angle of about 20° to provide for the return of the molten alkali metal or alkali salt (condensed vapor) to the chamber 53. The tube 55 should be kept at a temperature above the melting point, but below the boiling point of the alkali metal or alkali salt used. If necessary, this may be done by auxiliary gas burners or other heating means.

The wire or filament 56 may be slowly wound on spool 58 from spool 57 and passed through the tube 41 where it is heat-treated in the alkali-metal atmosphere, which is adapted to promote grain growth to such an extent that the treated wire emerging therefrom has non-sag and non-offset properties and is substantially of single-crystal formation. With 3 mil wire, a treating speed of about 1 inch per minute may be used.

Although I have described what I now consider the preferred methods and apparatus for practicing my invention, it is to be understood that the same are merely illustrative and that many modifications may be made therein within the spirit and scope of the appended claims.

What is claimed is:

1. The method of treating tungsten comprising pressing a slug of pure tungsten powder and treating the same by passing it through a very hot zone at a very slow rate of speed in a vacuum.

2. The method of treating a refractory metal whereby it is produced in the form of a single crystal comprising pressing a slug of the powdered metal and heat treating the same by slowly passing it through a heating element in a vacuum to be heated to a temperature most suitable for rapid grain growth, thereby allowing it to develop gradually into the form of a single crystal.

3. The method of treating a pressed slug of tungsten powder comprising partly sintering said slug until it can be handled without breaking, heat-treating the same by passing it slowly through a very hot zone and further treating said slug by passing it through a hot zone in a vacuum.

4. The method of treating tungsten whereby it is developed in mono-crystalline form comprising treating a pressed slug thereof at its critical grain-growing temperature and following said treatment by similar treatment in a vacuum.

5. The method of manufacturing tungsten in the form of a single crystal comprising preparing a slug of the pressed metal powder having a piece of single-crystal wire inserted into one end of the same and treating the slug so produced by passing the same through a very hot zone, the end containing the piece of single-crystal wire being first treated.

6. The method of manufacturing tungsten in the form of a single-crystal comprising pressing a piece of single-crystal wire into one end of the slug when it is formed from the tungsten powder, partly sintering the slug and treating the same by passing it through a zone of high temperature, the end containing the single-crystal wire being first treated.

7. The method of preparing non-sag tungsten in the form of a single crystal comprising preparing a pressed slug of tungsten having a piece of single-crystal tungsten in one end thereof, heat-treating said slug to its critical grain-growing temperature by passing the same through a heating element, the end of the slug in which the single-crystal is inserted being passed first through said heating element.

8. A single crystal of a refractory metal having a diameter larger than 1 millimeter.

9. A single crystal of tungsten having a diameter larger than 1 millimeter.

10. Ductile refractory metal consisting of a single crystal of said refractory metal having a diameter larger than 1 millimeter and mechanically shaped into a form different from that of the crystal.

11. Ductile tungsten consisting of a single crystal of tungsten having a diameter larger than 1 millimeter and mechanically shaped into a form different from that of the crystal.

In testimony whereof, I have hereunto subscribed my name this twenty-sixth day of October, 1922.

JOHN HUMPHREYS RAMAGE.